(No Model.) 2 Sheets—Sheet 2.
W. H. TRENGROVE.
DRIVING MECHANISM FOR CYCLES.
No. 588,198. Patented Aug. 17, 1897.
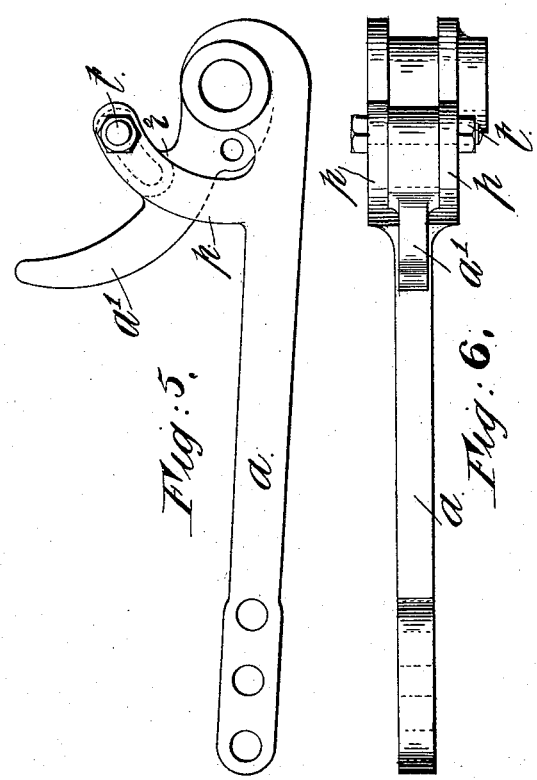
Witnesses
Peter Ellis
W. Cuming
Inventor
William Henry Trengrove
THE NORRIS PETERS CO., PHOTO-LITHO., WASHINGTON, D. C.

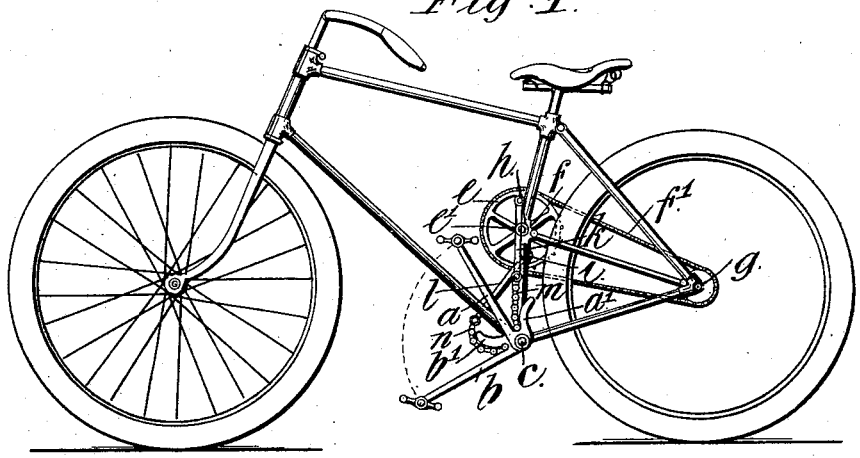
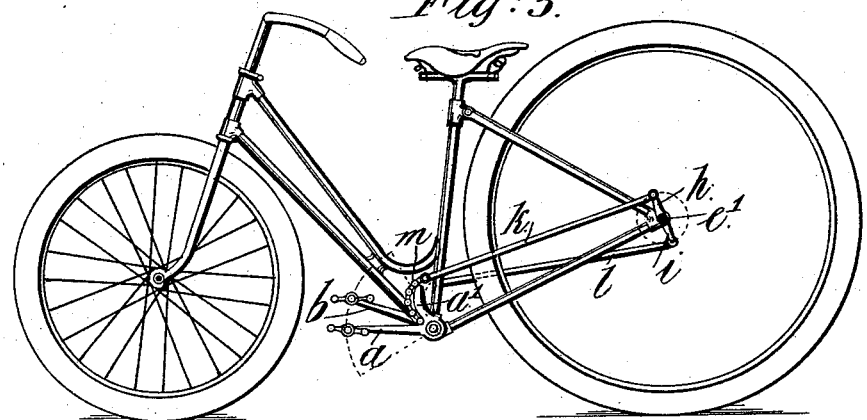
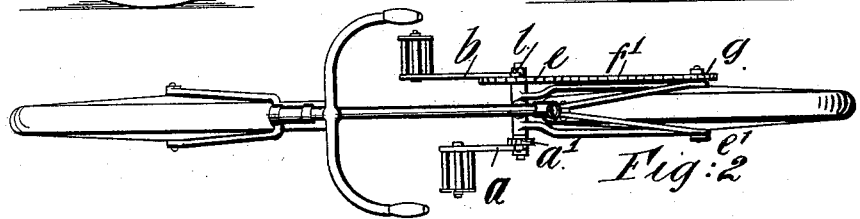
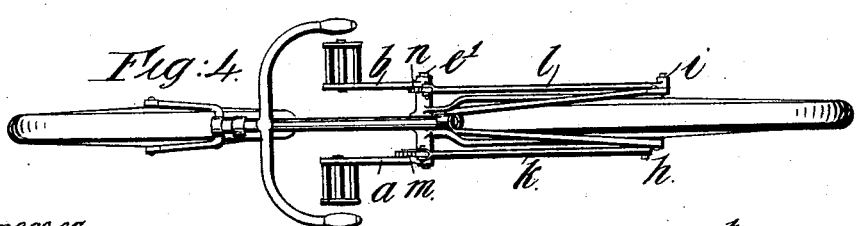

UNITED STATES PATENT OFFICE.

WILLIAM HENRY TRENGROVE, OF CHRISTCHURCH, NEW ZEALAND, ASSIGNOR TO THE TRENGROVE LEVER MOTION COMPANY, LIMITED, OF SAME PLACE.

DRIVING MECHANISM FOR CYCLES.

SPECIFICATION forming part of Letters Patent No. 588,198, dated August 17, 1897.

Application filed October 10, 1896. Serial No. 608,511. (No model.)

*To all whom it may concern:*

Be it known that I, WILLIAM HENRY TRENGROVE, a subject of the Queen of Great Britain, and a resident of 71 Cathedral Square, Christchurch, in the Colony of New Zealand, have invented Improved Driving Mechanism for Cycles, of which the following is a specification.

I will describe my invention as applied to the driving-gear of safety-bicycles, the parts being substantially the same as those required upon other machines where a similar result is to be obtained.

The rider of the bicycle operates pedal-levers which are arranged to vibrate either in bearings or upon rocking spindles supported in the bottom bracket of the machine. Each pedal-lever is provided with a cam, which is either made integral with or adjustably connected to it, and flexible connecting-rods connect these cams with cranks upon a spindle which is thereby caused to revolve and give motion to the driving-wheel of the machine.

The invention consists in the novel combination of the levers, cams, flexible connecting-rods, and cranks; and the object is to arrange the shape of the cams and their position in relation to the levers and cranks, respectively, so as to produce the best mechanical effect in actuating the machine.

Referring to the accompanying drawings, in which similar letters of reference indicate the same parts throughout the views, Figures 1 and 2 are respectively a side elevation and plan of a safety-bicycle, illustrating my invention; Figs. 3 and 4, similar views illustrating its application to a lady's safety-bicycle. Figs. 5 and 6 are respectively a side elevation and plan showing a cam adjustably connected, so that its position may be regulated in relation to the lever to which it is attached.

Referring first to Figs. 1 and 2, the pedal-levers $a\, b$ of the bicycle are pivoted upon the spindle $c$ in the bottom bracket of the machine, so as to vibrate through the arc indicated in dotted lines in Fig. 1. The cam-pieces $a'\, b'$ are made integral with the levers $a\, b$, respectively. The chain-wheel $e$ is mounted in a bearing $f$, secured to the frame of the machine, and is connected by an ordinary drive-chain $f'$ with the pinion $g$ upon the axle of the driving-wheel. The ends of the axle $e'$ of the chain-wheel $e$ are respectively provided with cranks or levers $h\, i$, arranged opposite to each other and to the ends of which are pivoted connecting-rods $k\, l$, having flexible portions $m\, n$ (which may be made of steel drive-chain) connecting them to the inner peripheries of the cams $a'\, b'$, respectively.

In Figs. 3 and 4 the chain-gearing $f\, f'\, g$ is dispensed with and the cranks $h\, i$ connected directly to the axle $e'$ of the driving-wheel.

Instead of making the cams integral with the levers it may be desirable to connect them adjustably, as illustrated in Figs. 5 and 6, the lever and cam being formed separately, the lever having arc-shaped projections $p$ upon either side, between which the cam $a'$, having a similarly-shaped projection $r$, is clamped by a bolt $t$, passing through corresponding holes in the projection $p$ and a slot in the projection $r$.

I claim—

1. In a bicycle the combination with the driven axle having a crank-arm thereon, of the main crank-axle, the crank $a$ thereon, the curved arm carried by said crank, and the chain having one end connected at the angle between the crank and curved arm and a connection from its other end to the arm on the driven axle, substantially as described.

2. In a bicycle, the combination with the driven axle having a crank-arm thereon, of the main crank-axle, the crank $a$ thereon, the curved arm carried by said crank, at an angle thereto, the chain having one end connected at the angle between the crank and curved arm and a connection from its other end to the arm on the driven axle, and means for varying the inclination of the curved arm in regard to the crank, substantially as described.

Dated this 30th day of July, 1896.

WILLIAM HENRY TRENGROVE.

Witnesses:
PETER ELBE,
HENRIE H. RAYWARD.